Aug. 10, 1965   J. R. NILSON   3,200,318
SPEED-REGULATING CONTROL SYSTEM FOR SERIES COMMUTATOR MOTORS
Filed July 5, 1961   2 Sheets-Sheet 1

WITNESS
William Martin

INVENTOR.
John R. Nilson
BY
Marshall J. Breen
ATTORNEY

Aug. 10, 1965                J. R. NILSON                3,200,318
SPEED-REGULATING CONTROL SYSTEM FOR SERIES COMMUTATOR MOTORS
Filed July 5, 1961                                         2 Sheets-Sheet 2

WITNESS
William Martin

INVENTOR.
John R. Nilson
BY
Marshall J. Breen
ATTORNEY

United States Patent Office

3,200,318
Patented Aug. 10, 1965

3,200,318
SPEED-REGULATING CONTROL SYSTEM FOR SERIES COMMUTATOR MOTORS
John R. Nilson, Mountainside, N.J., assignor to The Singer Company, Elizabeth, N.J., a corporation of New Jersey
Filed July 5, 1961, Ser. No. 121,994
1 Claim. (Cl. 318—246)

This invention relates to systems using solid state controlled rectifiers for regulating the speed of series commutator motors fed from an alternating current supply voltage.

A circuit using a solid state controlled rectifier for regulating the speed of series commutator motors has been shown and described in the United States Patent No. 2,939,064. In this patented circuit the reference voltage is obtained by a conductive connection with the supply voltage through a resistance voltage divider circuit. It is proposed, according to the present invention to obtain the reference voltage by mutual inductive coupling to the supply voltage. By changing the coupling, a stepless reference voltage is provided which, due to its electrical isolation from the supply voltage, permits greater freedom in the circuit location of the controlled rectifier than heretofore possible. Power dissipation is inherently less and the reliability is improved by the removal of all sliding contacts.

It is an object of this invention to provide a speed-responsive regulating system for series commutator motors employing mutually coupled inductance means for obtaining the reference voltage.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby, will be readily understood by those skilled in the art.

Figure 1:
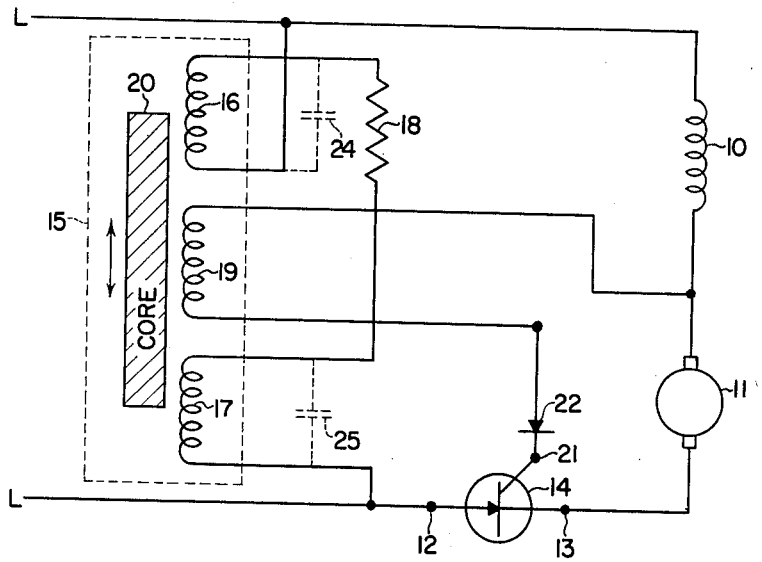
FIG. 1 is a schematic wiring diagram of a circuit embodying the invention.

Referring now to FIG. 1, a series commutator motor having series-connected field windings 10 and armature winding 11 is connected in series with the anode 12 and cathode 13 of a silicon controlled rectifier 14 and a source L—L of alternating current voltage. A differential transformer 15 has primary windings 16 and 17 connected in series opposition to the source L—L. A resistor 18 may be placed in series with the primary windings 16 and 17 as shown for the purpose of reducing the voltage applied to the windings. The necessary impedance can, of course, be incorporated in the primary windings 16 and 17 themselves, if desired.

A secondary winding 19 is positioned symmetrically between the windings 16 and 17, and a movable magnetic core member 20 is used to vary the mutual inductive coupling between the windings. For example, with the core 20 in its mid-position as shown in FIG. 1, equal coupling between each of the windings 16, 17 and the winding 19 produces cancellation (due to the series opposition connection of 16 and 17) of the mutual flux and no net voltage will be induced in winding 19. As the core 20 is moved upwards in FIG. 1, the coupling between windings 16 and 19 is increased and that between windings 17 and 19 is decreased. This differential action results in an A.C. voltage of predetermined instantaneous polarity being induced in winding 19 and the magnitude is substantially linearly proportional to the core movement. Similarly if the core 20 is moved downward from the position shown in FIG. 1, an A.C. voltage is induced in winding 19 of opposite instantaneous polarity from that induced by upward core movement from this position and its magnitude is substantially linearly proportional to core movement.

The winding 19 thus supplies an A.C. reference voltage of reversible phase and of a magnitude proportional to core movement. This reference voltage is applied in series with the armature winding 11 to the gate 21 and cathode 13 of the controlled rectifier 14. A diode 22 is placed in this circuit and has such a polarity as to permit only positive voltage to be applied to the gate 21.

Except for the method of obtaining and of varying the reference voltage, the circuit of FIG. 1 operates in the same manner as that shown and described in the United States Patent No. 2,939,064 referred to above.

Since the rectifier 14 will conduct only when the gate 21 and the anode 12 are positive with respect to the cathode 13 and since this voltage phase condition exists only for one direction of movement of the core from its mid-position, it is clear that any other position of the core produces no effective gate voltage and the motor remains stationary in this region of core movement. Thus with the differential transformer it is easy to establish a zero speed position for the core. As the core 20 is moved in the direction to supply a reference voltage of the proper phase to fire the rectifier 14, a stepless control of speed is obtained which is substantially linearly proportional to the core movement.

Due to the fact that, in this circuit, the reference voltage is electrically isolated from the supply voltage source, some freedom is permitted in the location of the controlled rectifier 14 itself. For example, the circuit of FIG. 1 would not be changed functionally if the field winding 10 were placed in series between the anode 12 and the junction of the connection of winding 17 with one side of the source L—L.

Figure 2:
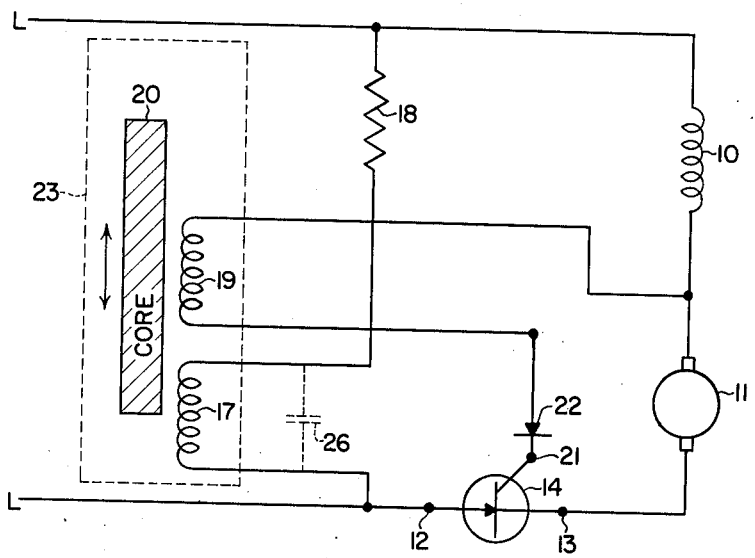
FIG. 2 is a modification of the embodiment shown in FIG. 1.

FIG. 2 is a modification of the circuit of FIG. 1 and differs therefrom essentially in the omission of the winding 16 which results in a simple two-winding mutual inductance controller 23 in place of the differential transformer 15 of FIG. 1. In this system only one primary winding 17 is used and the coupling between the primary and secondary windings 17 and 19 is varied by movement of the magnetic core 20. The operating characteristics are substantially the same as those of the differential transformer system of FIG. 1 except for one point. The minimum speed of the motor of FIG. 2 is determined by the minimum coupling between the primary and secondary windings 17 and 19 such as the core position shown. Since there will always be some coupling between these two windings it is impossible to establish a zero reference voltage in a positive manner and slow rotation of the motor may result.

A possible advantage of the system of FIG. 2 lies in the fact that the movement of the core produces a logarithmic change in the reference voltage which allows an expansion of the low speed control range without the use of complex mechanical linkages.

Further modifications may be made in the circuit of FIG. 1 by the addition of either one or both of the capacitors 24, 25 (shown in dotted lines) across the primary windings 16 and 17. These capacitors have the effect of changing the speed vs. torque characteristic by shifting the phase of the reference voltage.

Similarly in FIG. 2, a capacitor 26 (shown in dotted lines) may be added to shift the phase of the reference voltage relative to the voltage of the source L—L.

Figure 3:
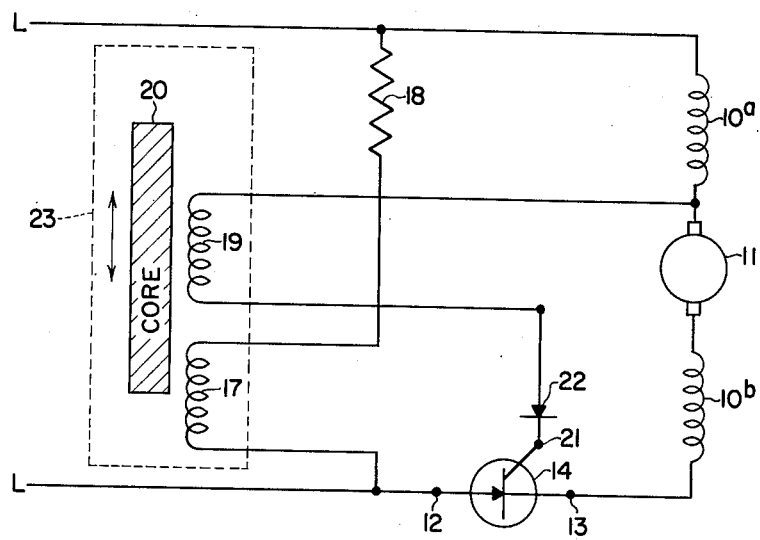
FIG. 3 is a modification of the embodiment shown in FIG. 2.

FIG. 3 shows a circuit which is essentially the same as FIG. 2 except that it is adapted for easy connection to series motors wherein the field is commonly split into two windings, 10a and 10b, which are connected symmetrically on each side of the armature winding. In this case it will be noted that the winding 10b forms part of the series circuit between the gate 21 and cathode 13 of the controlled rectifier 14. It has been found that the inclusion of one half the field winding in the gate circuit in this manner does not appreciably degrade the speed-torque characteristics and it represents a simpler circuit to apply to split-field motor than that involving the series insertion of the anode-cathode circuit of the controlled rectifier 14 between the armature and one of the field windings. The circuit of FIG. 3 will therefore come within the scope of the invention.

Having thus set forth the nature of the invention, what is claimed herein is:

A speed-regulating system for an electric motor having series-connected field and armature windings adapted to be fed from an alternating current supply voltage, a solid state controlled rectifier having an anode, a cathode and a gate, said anode and cathode being connected in series circuit relation with the field and armature windings, a differential transformer having primary windings connected to the supply voltage in mutual series opposition, a secondary winding inductively coupled to said primary windings for deriving a reference voltage, circuit means for impressing said reference voltage in series with the armature winding and the cathode and gate of the rectifier, and means for varying the magnetic coupling between said primary and secondary windings to adjust the reference voltage in phase and magnitude.

References Cited by the Examiner

UNITED STATES PATENTS

| | | | |
|---|---|---|---|
| 2,437,140 | 3/48 | Waldie | 318—345 |
| 2,725,511 | 11/55 | Jacobs | 318—202 |
| 2,939,064 | 5/60 | Momberg | 318—246 |

ORIS L. RADER, *Primary Examiner.*

MILTON O. HIRSHFIELD, *Examiner.*